United States Patent Office 3,476,554
Patented Nov. 4, 1969

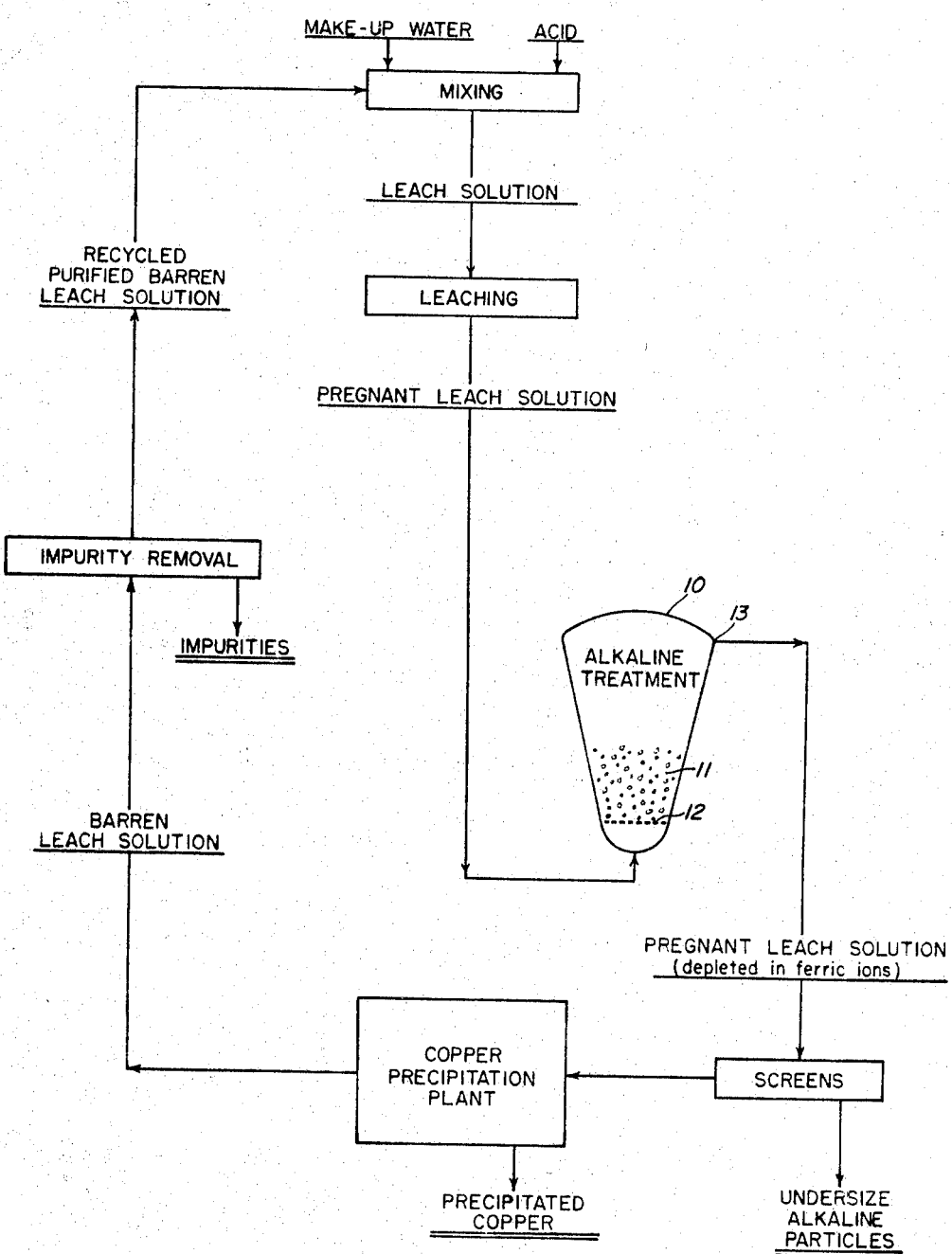

3,476,554
PROCESS FOR RECOVERING COPPER
FROM LEACH SOLUTIONS
Henry Rush Spedden and Emil E. Malouf, Salt Lake City,
Utah, assignors to Kennecott Copper Corporation, New
York, N.Y., a corporation of New York
Filed Feb. 21, 1968, Ser. No. 707,198
Int. Cl. C22b 15/12; C01g 49/04
U.S. Cl. 75—109                                    11 Claims

ABSTRACT OF THE DISCLOSURE

Leach solutions, pregnant with copper and containing ferric iron, are treated for the removal of ferric ions by bringing such solutions into intimate contact with discrete particles of a substantially insoluble alkaline solid. The copper content of the resulting solution is then recovered by conventional techniques. When the copper is recovered from solution by precipitation on metallic iron, iron consumption is significantly reduced. When the copper is recovered electrolytically, a considerable saving of electrical power is realized.

BACKGROUND OF THE INVENTION

Field

This invention relates to the recovery of copper from copper-bearing solutions. It is directly concerned with the removal of ferric ions from such solutions preparatory to introducing the solutions to the metal recovery step of the process.

Prior art

Weakly acidic solutions of sulfuric acid and ferric sulfate are customarily percolated through waste dumps of copper mines containing copper sulfide minerals to recover copper values therefrom.

The pregnant leach solution is then recovered by various techniques. Most often, copper is recovered electrolytically or by precipitation on metallic iron. In either event, previously recovered metallic copper is unavoidably contacted by pregnant leach solution as an incident of the metal recovery step. Other recovery processes involve contacting the copper-bearing leach solutions with copper precipitants other than metallic iron to precipitate copper salts. Ferric ions carried by the leach solution react with both iron and other copper precipitants thereby reducing the efficiency of the copper precipitation step. Although ferric sulfate is changed to ferrous sulfate by the leaching reaction, more or less of the ferric sulfate either remains unused in the pregnant leach solution or is present by reason of regeneration of the ferrous sulfate by atmospheric oxidation or by the oxidizing action of bacteria present in the mine waters.

The undesirability of ferric iron in the solution forwarded to either a copper precipitation plant or an electrolytic cell has been referred to in the literature. Efforts to conserve iron precipitant in copper precipitation plants have included the treatment of pregnant solutions with $SO_2$ to reduce ferric iron. Such treatments have not met with commercial success because of the prolonged treatment times required. Other efforts involve contacting the pregnant solution with cheap scrap iorn to convert ferric ions to ferrous ions prior to forwarding the solution to the precipitation plant. This treatment results in the undesirable dissolution of additional iron into the leach solution. Moreover, this treatmentis non-selective with respect to copper.

Alkaline materials have been used to treat copper-depleted leach liquors. U.S. Patent 1,971,416, for example, teaches a process whereby dissolved copper is first precipitated out of solution with metallic iron, and thereafter, an alkaline precipitant is added to the solution to cause the precipitation of ferrous hydroxide. U.S. Patent 1,580,614 dscloses a process which includes the step of removing iron from solution with lime rock after the electrolytic recovery of copper from the solution. These patents, which are typical of the prior art, teach the removal of iron from copper-bearing solutions after the recovery of copper from the solution. The same sequence is followed whether the copper is recovered electrolytically or by precipitation.

SUMMARY OF THE INVENTION

In accordance with the present invention, ferric ions are removed from pregnant leach solution before such solution is introduced to the metal recovery step of the process; that is, before the solution is allowed to contact previously recovered metallic copper. Ferric ion removal is advantageously accomplished by bringing the pregnant solution into intimate contact with a substantially insoluble alkaline solid. Suitable materials for use include various forms of calcium carbonate, such as natural lime sand or limestone; magnesium carbonate, e.g. magnesite, and similar naturally occurring carbonates, e.g., dolomite. It has been found that treatment of the pregnant solution in this fashion results in an unexpectedly large saving of precipitant, e.g., iron consumption, in a copper precipitation plant. Similar economic benefits are realized in an electrolytic plant due to decreased power requirements.

It is commonly believed that ferric iron salts consume metallic iron in a precipitation plant according to the reaction: $2Fe^{+++}+Fe° \rightarrow 3Fe^{++}$. We have reason to believe, however, that large-scale consumption of metallic iron results from the action of ferric ions on previously precipitated metallic copper. Thus, copper metal is re-dissolved by the ferric solution. This re-dissolved copper must be re-precipitated, thereby consuming metallic iron to a degree heretofore unappreciated in the art. Although applicants do not wish to be bound by any particular theory or chemical mechanism to explain their invention, the foregoing is presented by way of a plausible explanation for the remarkable benefits obtained by the practice of their invention.

Generally stated, the invention involves selectively removing ferric ions from a copper-bearing process stream prior to the copper-recovery step of the process. The ferric ion removal taught by this invention is not intended to replace the iron-removal treatments of the prior art; nor are such treatments entirely suitable for use in accordance with this invention. An important aspect of this invention is the removal of a substantial amount of the ferric iron from solution while leaving essentially all of the dissolved copper in solution. It is essential that the treatment not render the solution unsuitable for the copper recovery step. The prior art procedures for removing ferric ions from solution either lack the necessary selectivity for use prior to the copper recovery step or they alter the gross properties of the solution, rendering it unsuitable for use either as an electrolyte or as feed to a copper precipitation plant. The claimed treatment selectively removes ferric ions without otherwise significantly affecting the chemical composition or pH of the solution.

The present invention provides a single, economical, continuous process which selectively removes a substantial percentage of the ferric ions from a pregnant, copper-bearing solution without removing significant amounts of copper therefrom. According to the preferred embodiments of this invention, alkaline particles are hydraulically suspended in a flowing stream of pregnant, copper-bearing solution.

The alkaline particles may be manufactured, e.g., prills, beads, or pellets; a screened fraction of comminuted rock, e.g., limestone, magnesite, or dolomite; or naturally occurring, particulate, alkaline material, e.g., lime sand. The size of the particles selected for use will depend on the density of the particles, the surface characteristics of the particles, and the flow rate of the solution, among other considerations. Although the particles should be sufficiently small to be hydraulically suspended and tumbled, very fine material should be avoided because of its high surface area and consequent higher rate of dissolution. Properly sized alkaline material removes ferric ions without altering the pH of the solution. The alkaline material should be of a composition or form which has a low rate of dissolution in the solution; that is, the particles should be persistent under the conditions of the treatment. Accordingly, if readily soluble materials, such as the hydoxides of calcium, sodium, or potassium, are employed, they are desirably use in a dense form, with relatively low surface area per pound. The preferred materials for use have low solubilitites in acid solution. Sufficient particles are used to provide good contact of the solution by the alkaline material. The amount of material required per volume of flow is variable and depends upon the solution composition and particle size of the alkaline material, among other factors. The quantity used should remove a significant proportion of the ferric iron from solution without substantially altering the pH of the solution.

The particles are contacted in a suitable treatment vessel by the flowing solution at sufficient velocity to provide a limited, short contact time between the particles and the solution. As a result, the ferric ions are removed from solution as insoluble precipitates which form on the surfaces of the particles. It has been found that the contact time, as measured by the residence time of the solution in the treatment vessel, can be adjusted to remove very substantial amounts of the ferric iron from solution while removing essentially none of the copper therefrom. Preferably, the solution is directed upwardly through a bed of the particles at sufficient velocity to hydraulically suspend the particles. Undersized particles are washed from the vessel. The particles should be suspended dynamically to facilitate scouring of iron precipitates, e.g., ferric hydroxide, from the surface of the particles. Thus, the size and density of the particles are correlated with the velocity of the feed to the vessel to provide the appropriate tumbling motion of the particles and the appropriate residence time of the solution in the vessel.

DESCRIPTION OF THE DRAWING

The drawing illustrates a system which is presently contemplated as the best mode of practicing the invention.

The single figure of the drawing is a flowsheet illustrating the invention as applied to a leaching operation wherein copper metal is recovered by precipitation on metallic iron.

DETAILED DESCRIPTION OF THE ILLUSTRATED EMBODIMENT

As illustrated, pregnant leach solution is injected upwardly through the downwardly directed apex of a precipitation vessel 10 of inverted conical formation. A particularly useful vessel for this purpose is that shown in Back et al., U.S. Patent No. 3,154,411. The pregnant solution is directed into and through a bed 11 of discrete particles of the alkaline solid at a velocity such that the solid particles are tumbled against one another. A screen 12 at the bottom of the vessel supports the bed when flow through the vessel is stopped. As the solution rises through the vessel, iron compounds are precipitated on the surfaces of the solid particles. Because of the tumbling motion of the particles, these precipitates are regularly abraded off, exposing the surfaces of the particles for subsequent repeated precipitations and abrasions. The thus-precipitated and freed iron compounds form flocs, which rise and overflow the rim 13 of the vessel with the still pregnant solution. No special procedures for the removal of these flocs are required. They may be carried along with the solution through the copper precipitation plant. As the particles become abraded, they lose weight and are eventually carried by the flowing solution over rim 13. The solution is passed through screens to remove these overflowing alkaline particles. It is then treated in conventional manner in a copper precipitation plant for the recovery of copper metal. The barren solution from the copper precipitation plant is treated as required to remove various impurities and the purified, barren solution is recycled to leach further copper values.

Other ways of precipitating the iron compounds on the alkaline solids can, of course, be employed, although in all instances it is preferred that a flowing stream of the solution be brought into contact with the alkaline solids with sufficient force to dislodge the iron precipitates therefrom or to cause an abrading action between the particles themselves for that purpose.

The invention will be better understood with reference to the following examples:

EXAMPLE I

Pregnant, copper-bearing solution was passed through a conditioning bed of oolitic lime sand contained in a laboratory-sized precipitation vessel. The lower portion of the vessel was conical in shape increasing in diameter from ⅜ of an inch, at the inlet or apex of the cone, to 4 inches, over the first 31 inches of the vessel's length. The shape of the vessel over the next 14 inches of its length was cylindrical. The remaining length of 8 inches was shaped as a cone, increasing in diameter from 4 to 13 inches. Solution was introduced at the apex of the vessel and was withdrawn from the top of the vessel through outlets provided near the rim of the upper cone.

Solution assaying 0.89 gram per liter copper and 0.44 gram per liter ferric iron was introduced to the vessel at rates sufficient to suspend the lime sand in the cylindrical portion of the vessel. Lime sand was introduced from the top of the vessel, as required, to maintain a fluid bed about 10 inches deep. The lime sand was sized in a range from −10 to +65 mesh. Flow rates of 15–20 liters per minute corresponded to solution residence times of about 20–30 seconds.

In this small-scale test, residence time and contact time of the solution with the alkaline material may be considered identical without substantial error.

Table 1 reports results from several runs in which flow rates were selected to effect various retention times.

Table 1

Treatment of copper-bearing solutions with oolitic lime sand to remove ferric ions.

| | Percent removed (based on assays before and after treatment) | |
| --- | --- | --- |
| | Copper | Ferric ion |
| Residence time, seconds: | | |
| 15 | None | 41 |
| 20 | None | 51 |
| 30 | None | 51 |
| 150 | 4.5 | 96 |
| 300 | 4.5 | 100 |

EXAMPLE II

A commercial scale operation could employ a precipitation cone of the type disclosed by Back et al. in U.S. Patent 3,154,411 as the treatment vessel. A cone 20 feet high with a maximum diameter of 20 feet would be charged with sufficient oolitic lime sand to maintain a dynamic fluid, conditioning bed about 7 feet thick at flow rates of about 1,000–1,500 gallons per minute. Lime sand would be replaced at the rate it was consumed to maintain the conditioning bed.

Although greater contact times may be appropriate for solutions containing greater concentrations of ferric ions, contact times of about 15 to about 30 seconds are usually adequate for ferric ion removal and are preferred. Shorter contact times may be employed, but contact times of less than about 5 seconds often result in insufficient removal of ferric ion. Contact times in excess of about 1 minute are rarely employed because they may result in unacceptable losses of copper.

Reference herein to details of specific embodiments is not intended to restrict the scope of the invention except insofar as these details are included in the appended claims. Many modifications, within the scope of the invention, will be suggested to those skilled in the art by the present disclosure.

We claim:

1. In a process for recovering metallic copper from pregnant leach solutions, which includes the bringing of such a leach solution into contact with previously recovered metallic copper as an incident of recovering copper from said solution, the improvement comprising bringing said solution into contact with discrete particles of a substantially insoluble alkaline solid for the removal of ferric ions therefrom prior to bringing said solution into contact with said previously recovered metallic copper.

2. The improvement of claim 1, wherein the discrete particles of alkaline solid comprise calcium carbonate.

3. The improvement of claim 2, wherein the calcium carbonate is finely divided limestone.

4. The improvement of claim 3, wherein the finely divided limestone is in the form of natural lime sand.

5. The improvement of claim 1, wherein the ferric ions react with the alkaline particles to form precipitates on the surfaces thereof and the precipitates are continuously abraded from said surfaces.

6. The improvement of claim 1, wherein a mass of the discrete alkaline particles is contained in a vessel and solution is introduced at the bottom of the vessel and withdrawn at the top of the vessel at velocity which provides a residence time for said particles sufficient to remove a substantial amount of ferric ions but essentially none of the copper from said solution, the size and density of said particles and the flow rate of said solution being chosen such that the particles are hydraulically suspended in the vessel.

7. The improvement of claim 6 wherein the residence time of the solution in the vessel is selected to provide a contact time of the solution with the particles of less than about 1 minute.

8. The improvement of claim 6, wherein the contact time of the solution with the particles is held between about 15 and about 30 seconds.

9. The improvement of claim 6, wherein the alkaline particles are natural lime sand and the flow rate of the solution is sufficient to cause the particles to tumble against one another thereby to continuously scour the surfaces of said particles free from iron precipitates.

10. The improvement of claim 9, wherein the contact time of the solution with the lime sand is less than about 30 seconds.

11. The improvement of claim 6, wherein the vessel is in the shape of a cone and the pregnant solution is introduced at the apex of the cone.

References Cited

UNITED STATES PATENTS

| 1,580,614 | 4/1926 | Laist et al. | 204—108 |
| 1,971,416 | 8/1934 | Keyes | 75—117 |
| 2,008,373 | 7/1935 | Tobelmann | 75—109 |

L. DEWAYNE RUTLEDGE, Primary Examiner

T. R. FRYE, Assistant Examiner

U.S. Cl. X.R.

75—117; 204—108